(12) United States Patent
Stets, Jr. et al.

(10) Patent No.: US 9,092,510 B1
(45) Date of Patent: Jul. 28, 2015

(54) MODIFYING SEARCH RESULT RANKING BASED ON A TEMPORAL ELEMENT OF USER FEEDBACK

(75) Inventors: Robert J. Stets, Jr., Palo Alto, CA (US);
Mark Andrew Paskin, Belmont, CA (US)

(73) Assignee: Google Inc., Mountain View, CA (US)

( * ) Notice: Subject to any disclaimer, the term of this patent is extended or adjusted under 35 U.S.C. 154(b) by 95 days.

(21) Appl. No.: 11/742,447

(22) Filed: Apr. 30, 2007

(51) Int. Cl.
*G06F 17/30* (2006.01)
*G06F 7/00* (2006.01)

(52) U.S. Cl.
CPC .... *G06F 17/30648* (2013.01); *G06F 17/30064* (2013.01)

(58) Field of Classification Search
CPC ................... G06F 17/30044; G06F 17/30876; G06F 17/301; G06F 17/30551; G06F 17/30648
USPC .................................................. 707/723, 727
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 6,006,222 A | 12/1999 | Culliss | |
| 6,006,225 A | 12/1999 | Bowman et al. | |
| 6,014,665 A | 1/2000 | Culliss | |
| 6,026,288 A | 2/2000 | Bronner | |
| 6,067,565 A * | 5/2000 | Horvitz .......................... | 709/218 |
| 6,076,051 A | 6/2000 | Messerly et al. | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |

(Continued)

FOREIGN PATENT DOCUMENTS

| | | |
|---|---|---|
| WO | WO 00/77689 | 12/2000 |
| WO | WO 01/16807 | 3/2001 |

(Continued)

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

(Continued)

*Primary Examiner* — Pavan Mamillapalli
(74) *Attorney, Agent, or Firm* — Fish & Richardson P.C.

(57) ABSTRACT

In general, the subject matter described in this specification can be embodied in a method that includes: obtaining user feedback associated with quality of an electronic document; adjusting a measure of relevance for the electronic document based on a temporal element of the user feedback; and outputting the measure of relevance to a ranking engine for ranking of search results, including the electronic document, for a search for which the electronic document is returned. Obtaining the user feedback can include receiving user selections of documents presented by a document search service, the method can include evaluating the user selections in accordance with an implicit user feedback model to determine the measure of relevance, and adjusting the measure of relevance can include adjusting the measure of relevance in accordance with the implicit user feedback model.

15 Claims, 6 Drawing Sheets

(56) References Cited

U.S. PATENT DOCUMENTS

| | | | |
|---|---|---|---|
| 6,182,066 B1 | 1/2001 | Marques |
| 6,182,068 B1 | 1/2001 | Culliss |
| 6,185,559 B1 | 2/2001 | Brin et al. |
| 6,249,252 B1 | 6/2001 | Dupray |
| 6,269,368 B1 | 7/2001 | Diamond |
| 6,285,999 B1 | 9/2001 | Page |
| 6,321,228 B1 | 11/2001 | Crandall et al. |
| 6,327,590 B1 | 12/2001 | Chidlovskii et al. |
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan |
| 6,473,752 B1 | 10/2002 | Fleming, III |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,640,218 B1 | 10/2003 | Golding et al. |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,963,867 B2 | 11/2005 | Ford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,249,126 B1 | 7/2007 | Ginsburg et al. |
| 7,266,765 B2 | 9/2007 | Golovchinsky et al. |
| 7,293,016 B1 | 11/2007 | Shakib et al. |
| 7,346,839 B2 * | 3/2008 | Acharya et al. ................ 1/1 |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,499,919 B2 | 3/2009 | Meyerzon et al. |
| 7,516,146 B2 * | 4/2009 | Robertson et al. ............ 707/102 |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,603,350 B1 | 10/2009 | Guha |
| 7,610,282 B1 | 10/2009 | Datar et al. |
| 7,657,626 B1 | 2/2010 | Zwicky |
| 7,676,507 B2 | 3/2010 | Maim |
| 7,680,775 B2 | 3/2010 | Levin et al. |
| 7,693,818 B2 | 4/2010 | Majumder |
| 7,716,225 B1 * | 5/2010 | Dean et al. .................... 707/748 |
| 7,747,612 B2 | 6/2010 | Thun et al. |
| 7,756,887 B1 | 7/2010 | Haveliwala |
| 7,769,740 B2 * | 8/2010 | Martinez et al. ............. 707/706 |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,856,446 B2 | 12/2010 | Brave et al. |
| 7,877,404 B2 | 1/2011 | Achan et al. |
| 7,895,177 B2 | 2/2011 | Wu |
| 7,925,649 B2 | 4/2011 | Jeh et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,051,061 B2 | 11/2011 | Niu et al. |
| 8,060,456 B2 | 11/2011 | Gao |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,073,867 B2 | 12/2011 | Chowdhury |
| 8,082,242 B1 | 12/2011 | Mysen et al. |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 8,239,370 B2 | 8/2012 | Wong et al. |
| 8,412,699 B1 | 4/2013 | Mukherjee |
| 8,447,760 B1 | 5/2013 | Tong et al. |
| 8,458,165 B2 | 6/2013 | Liao |
| 8,498,974 B1 | 7/2013 | Kim et al. |
| 8,521,725 B1 | 8/2013 | Pearson |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0187837 A1 | 10/2003 | Culliss |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 * | 1/2004 | Krohn et al. .................. 715/513 |
| 2004/0034632 A1 | 2/2004 | Carmel et al. |
| 2004/0049486 A1 | 3/2004 | Scanlon |

(56) References Cited

U.S. PATENT DOCUMENTS

| | | |
|---|---|---|
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0021397 A1 | 1/2005 | Cui et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0036593 A1 | 2/2006 | Dean et al. |
| 2006/0047643 A1 | 3/2006 | Chaman |
| 2006/0069667 A1 | 3/2006 | Manasse et al. |
| 2006/0074903 A1 | 4/2006 | Meyerzon |
| 2006/0089926 A1 | 4/2006 | Knepper et al. |
| 2006/0095421 A1 | 5/2006 | Nagai et al. |
| 2006/0106793 A1 | 5/2006 | Liang |
| 2006/0123014 A1* | 6/2006 | Ng .................... 707/100 |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus |
| 2006/0230040 A1 | 10/2006 | Curtis et al. |
| 2006/0259476 A1 | 11/2006 | Kadayam et al. |
| 2006/0293950 A1 | 12/2006 | Meek |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski |
| 2007/0061195 A1 | 3/2007 | Liu |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran |
| 2007/0260597 A1 | 11/2007 | Cramer |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulcewski |
| 2008/0189269 A1 | 8/2008 | Olsen |
| 2008/0208825 A1 | 8/2008 | Curtis et al. |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0006438 A1 | 1/2009 | Tunkelang et al. |
| 2009/0012969 A1 | 1/2009 | Rail et al. |
| 2009/0055392 A1 | 2/2009 | Gupta et al. |
| 2009/0070194 A1 | 3/2009 | Song |
| 2009/0157643 A1 | 6/2009 | Gollapudi et al. |
| 2009/0182723 A1 | 7/2009 | Shnitko et al. |
| 2009/0187557 A1 | 7/2009 | Hansen et al. |
| 2009/0228442 A1 | 9/2009 | Adams |
| 2009/0287656 A1 | 11/2009 | Bennett |
| 2009/0313242 A1 | 12/2009 | Kodama |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2010/0299317 A1 | 11/2010 | Uy |
| 2010/0325131 A1 | 12/2010 | Dumais et al. |
| 2011/0064795 A1 | 3/2011 | Tosi et al. |
| 2011/0087656 A1 | 4/2011 | Oh et al. |
| 2011/0179093 A1 | 7/2011 | Pike et al. |
| 2011/0219025 A1 | 9/2011 | Lipson |
| 2011/0264670 A1 | 10/2011 | Banerjee et al. |
| 2011/0282906 A1 | 11/2011 | Wong |
| 2011/0295844 A1 | 12/2011 | Sun et al. |
| 2011/0295879 A1 | 12/2011 | Logis |
| 2012/0011148 A1 | 1/2012 | Rathus |
| 2012/0191705 A1 | 7/2012 | Tong et al. |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Boyan et al.; *A Machine Learning Architecture for Optimizing Web Search Engines*; Aug. 1996; Internet-based information systems—Workshop Technical Report—American Association for Artificial Intelligence, p. 1-8.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Joachims; *Optimizing search engines using clickthrough data*; 2002; Proceedings of the ACM SIGKDD International Conference on Knowledge Discovery and Data Mining, p. 133-142.

Kelly, et al.; *Implicit Feedback for Inferring User Preference: A Bibliography*; SIGIR Forum, vol. 37, No. 2 (2003), pp. 18-28.

U.S. Appl. No. 10/726,345, filed Dec. 3, 2003, Pearson et al.

U.S. Appl. No. 10/878,926, filed Jun. 28, 2004, Battle et al.

U.S. Appl. No. 12/331,872, Le et al.

Burke, "Integrating Knowledge-based and Collaborative-filtering Recommender Systems," AAAI Technical Report WS-99-01. Compilation copyright © 1999, AAAI (www.aaai.org), pp. 69-72.

Diligenti, et al., "Users, Queries and Documents: A Unified Representation for Web Mining," wi-iat, vol. 1, 2009 IEEE/WIC/ACM (56) References Cited

OTHER PUBLICATIONS

International Joint Conference on Web Intelligence and Intelligent Agent Technology, 2009, pp. 238-244.
Grčar, "User Profiling: Collaborative Filtering," SIKDD 2004, Oct. 12-15, 2004, Ljubljana, Slovenia, 4 pages.
Hofmann, "Latent Semantic Models for Collaborative Filtering," ACM Transactions on Information Systems, vol. 22, No. 1, Jan. 2004, pp. 89-115.
Lemire, "Scale and Translation Invariant Collaborative Filtering Systems," published in Information Retrieval, 8(1):129-150, 2005.
Linden, et al., "Amazon.com Recommendations: Item-to-Item Collaborative Filtering," [online], http://computer.org/internet/, IEEE Internet Computing, Jan.-Feb. 2003, IEEE Computer Society, pp. 76-80.
Nicole, "Heeii is StumbleUpon Plus Google Suggestions," [online], Retrieved from the Internet http://mashable.com/2007/05/15/heeii/, 11 pages.
Radlinski and Joachims, "Query Chains: Learning to Rank from Implicit Feedback," KDD '05, Aug. 21-24, 2005, Chicago, IL, USA, 10 pages.
Schwab and Kobsa, "Adaptivity through Unobstrusive Learning," KI 3(2002), Special Issue on Adaptivity and User Modeling, pp. 5-9.
Stoilova, et al., GiveALink: Mining a Semantic Network of Bookmarks for Web Search and Recommendation, LinkKDD '05, Aug. 21, 2005, Chicago, IL, USA, 8 pages.
Xiao, et al., Measuring Similarity of Interests for Clustering Web-Users, ADC, 2001, pp. 107-114.
Yu, et al., "Selecting Relevant Instances for Efficient and Accurate Collaborative Filtering," CIKM '01, Nov. 5-10, 2001, Atlanta, GA, USA, pp. 239-246.
Zeng, et al., Similarity Measure and Instance Selection for Collaborative Filtering, WWW '03, May 20-24, 2003, Budapest, Hungary, pp. 652-658.
Bar-Llan et al., ""Presentation Bias is Significant in Determining User Preference for Search Results—A User X Study""; Journal of the American Society for Information Science and Technology, vol. 60, Issue 1 (p. 135-149), Sep. 2008, 15 pages.
Bar-Llan et al.; ""Methods for comparing rankings of search engine results""; Computer Networks: The International Journal of Computer and Telecommunications Networking, Jul. 2006, vol. 50, Issue 10 , 19 pages.
Boldi, et al.; The Query-flow Graph: Model and Applications; CKIM '08, Oct. 26-30, Napaya Valley, California, USA, p. 609-617.
Craswell, et al.; Randon Walks on the Click Graph; Jul. 2007; SIGIR '07, Amsterdam, the Netherlands, 8 pages.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
U.S. Patent Office, U.S. Appl. No. 11/556,143, filed Nov. 2, 2006, in Office Action mailed Jan. 25, 2010, 14 pages.
U.S. Patent Office, U.S. Appl. No. 11/556,143, filed Nov. 2, 2006, in Office Action mailed Jul. 6, 2010, 20 pages.
U.S. Patent Office, U.S. Appl. No. 11/556,143, filed Nov. 2, 2006, in Office Action mailed Apr. 20, 2011, 18 pages.
McDonnell, Philip, A., "Time Based Ranking," U.S. Appl. No. 11/870,893, filed Oct. 11, 2007, 42 pages.
U.S. Patent Office, U.S. Appl. No. 11/685,095, filed Mar. 12, 2007, in Office Action mailed Feb. 8, 2010, 31 pages.
U.S. Patent Office, U.S. Appl. No. 11/685,095, filed Mar. 12, 2007, in Office Action mailed Feb. 25, 2009, 21 pages.
U.S. Patent Office, U.S. Appl. No. 11/685,095, filed Mar. 12, 2007, in Office Action mailed Sep. 10, 2009, 23 pages.
U.S. Patent Office, U.S. Appl. No. 11/685,095, filed Mar. 12, 2007, in Office Action mailed Apr. 13, 2011, 31 pages.
U.S. Patent Office, U.S. Appl. No. 11/556,086, filed Nov. 2, 2006, in Office Action mailed Jun. 23, 2010, 21 pages.
W3C, URIs, URLs and URNs: Classification and Recommendations 1.0, Report from the joint W3C/IETF URI Planning Interest Group, Sep. 21, 2001, 8 pages.
Xie et al., Web User Clustering from Access Log Using Belief Function, K-CAP '01, Oct. 22-23, 2001, Victoria, British Columbia, Canada, pp. 202-208.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Soumen Chakrabarti, et al. "Enhanced Topic Distillation using Text, Markup tags, and Hyperlinks". ACM, Sep. 9-12, 2001, pp. 208-216.
Gabriel Somlo et al., "Using Web Hepler Agent Profiles in Query Generation", ACM, Jul. 2003, pp. 812-818.
Australian Examiner, Tim Yang, Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, Apr. 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.
Zeng, et al., "Learning to Cluster Web Search Results", SIGIR '04, Proceedings of the 27th Annual International ACM SIGIR conference on research and development in information retrieval, 2004.
"Personalizing Search via Automated Analysis of Interests and Activities," by Teevan et al. IN: SIGIR '05 (2005). Available at: ACM.
Baeza-Yates, Ricardo, Carlos Hurtado, and Marcelo Mendoza. "Query recommendation using query logs in search engines." Current Trends in Database Technology-EDBT 2004 Workshops. Springer Berlin Heidelberg, 2005.
Velez, Bienvenido, et al. "Fast and effective query refinement." ACM SIGIR Forum. vol. 31. No. SI. ACM, 1997.
Mandala, Rila, Takenobu Tokunaga, and Hozumi Tanaka. "Combining multiple evidence from different types of thesaurus for query expansion." Proceedings of the 22nd annual international ACM SIGIR conference on Research and development in information retrieval. ACM, 1999.

\* cited by examiner

MODIFYING SEARCH RESULT RANKING BASED ON A TEMPORAL ELEMENT OF USER FEEDBACK

BACKGROUND

The present disclosure relates to ranking of search results.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance, generally associated with the GOOGLE® PageRank technology, is premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for ranking search results of a search query are described. In general, particular inputs may be generated or analyzed to affect the presentation of search results. For example, such inputs may increase the relevance that a system will assign to a particular result in a particular situation, thus boosting the score or other indicator of relevance for the result (and perhaps the relevance of the result in the context of a particular query). Such an approach may benefit a user by providing them with search results that are more likely to match their needs. As a result, users can learn more using the interne, can find more relevant information more quickly, and will thus achieve more in their work or elsewhere, and will be more likely to use such a system again. A provider of such services may also benefit, by providing more useful services to users, and by thereby inducing more traffic to their search services. Such additional traffic may provide an operator with additional revenue, such as in the form of advertising that accompanies the searching and the delivery of search results.

The subject matter described in this specification can be embodied in a computer-implemented method that includes obtaining user feedback associated with quality of an electronic document; adjusting a measure of relevance for the electronic document based on a temporal element of the user feedback; and outputting the measure of relevance to a ranking engine for ranking of search results, including the electronic document, for a search for which the electronic document is returned. Obtaining user feedback can include receiving user selections of documents presented by a document search service, and the method can include evaluating the user selections in accordance with an implicit user feedback model to determine the measure of relevance, and adjusting the measure of relevance can include adjusting the measure of relevance in accordance with the implicit user feedback model.

Adjusting the measure of relevance can include comparing change over time in user selections of the electronic document with change over time in user selections of the documents. The implicit user feedback model can include a background population click trend model and adjusting the measure of relevance can include: determining a likelihood ratio for the electronic document and the documents with respect to the background population click trend model; and modifying the measure of relevance for the electronic document based on a difference between a document click trend model for the electronic document and the background population click trend model.

Evaluating the user selections in accordance with the implicit user feedback model can include determining the measure of relevance for the electronic document within a context of a search query for which the electronic document is returned by the document search service. Adjusting the measure of relevance can include adjusting contributions of the user selections to the measure of relevance based on temporal distance between a current time and times of the user selections. Moreover, adjusting the measure of relevance can include weighting the user selections based on recency of document viewing grouped into time span categories.

Weighting of the user selections can be initiated only after a total number of selections within a context of a search query surpasses a threshold. The threshold can be one hundred selections within the context of the search query. In addition, the time span categories can include less than two weeks old, two to four weeks old, four to six weeks old, six to eight weeks old, and more than eight weeks old, and the weighting can include: applying no weighting to selections that are less than two weeks old; applying at least a fifteen percent reduction weighting to selections that are two to four weeks old; applying at least a fifty percent reduction weighting to selections that are four to six weeks old; applying at least a seventy five percent reduction weighting to selections that are six to eight weeks old; and applying at least a ninety percent reduction weighting to selections that are more than eight weeks old.

The subject matter described in this specification can also be embodied in various systems, apparatus and corresponding computer program products (encoded on a computer-readable medium and operable to cause data processing apparatus to perform method operations). For example, a system can include a tracking component and a rank modifier engine structured to perform the operations described. Moreover, a system can include various means for performing the operations described, as detailed below, and equivalents thereof.

Particular embodiments of the described subject matter can be implemented to realize one or more of the following advantages. A ranking sub-system can include a rank modifier engine that uses implicit user feedback to cause re-ranking of search results in order to improve the final ranking presented to a user of an information retrieval system. User selections of search results (click data) can be tracked and evaluated in accordance with an implicit user feedback model, where age of the user selections is taken into account. For example, once a given query accumulates enough clicks to be considered frequent (e.g., 100 clicks) weights can then be assigned to each click according to its age. This can reduce the self-reinforcing effects in frequent queries, where the longer a given document is gathering clicks, the more likely it is to place well in future searches and to thereby gather even more clicks. Infrequent queries, which typically have less click data, can be left unchanged. Thus, the implicit user feedback model can be unchanged initially, but once a significant amount of user selections have been observed, historic user selections can be down-weighted based on their age, which can result in improved re-ranking of search results. In addition, statistical techniques can be used to identify trends in historic user selections and improve re-ranking of search results.

The details of one or more implementations are set forth in the accompanying drawings and the description below. Other features, aspects, and advantages will become apparent from the description, the drawings, and the claims.

DESCRIPTION OF THE DRAWINGS

Like reference numbers and designations in the various drawings indicate like elements.

DETAILED DESCRIPTION

Figure 1:
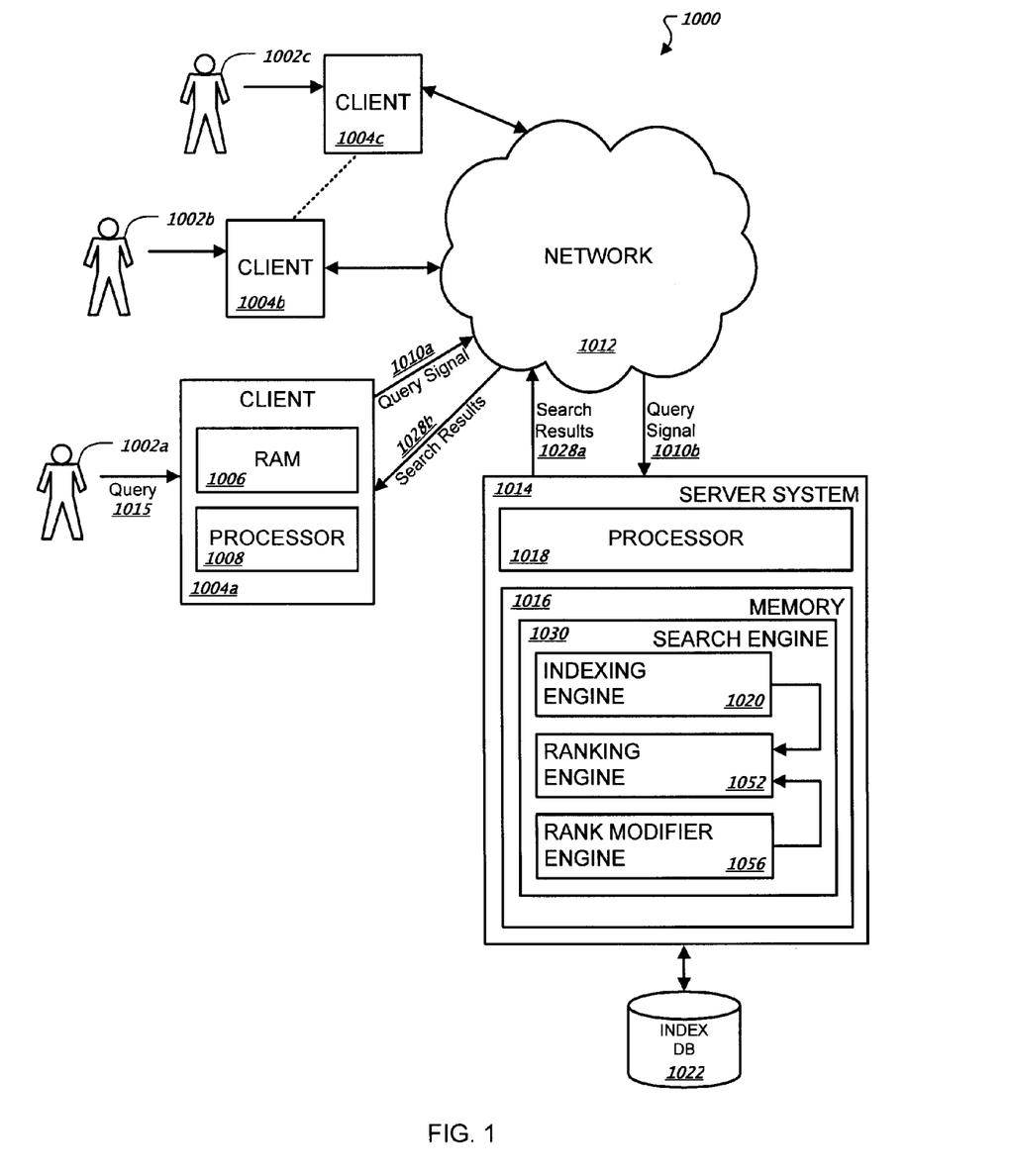
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented.

Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to a search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 can be one or more server devices in one or more locations. A server device 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in the GOOGLE® PageRank system, which treats a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more measures of relevance for the documents, which can be used by the ranking engine 1052 to improve the search results' ranking provided to the user 1002. The rank modifier engine 1056 can perform one or more of the operations described further below to generate and adjust the one or more measures of relevance.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the user 1002a.

Figure 2:
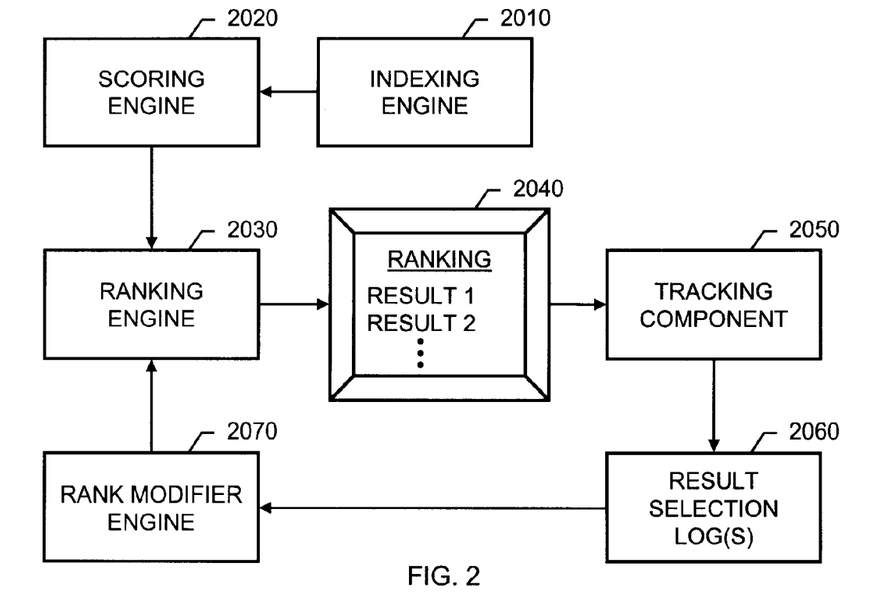
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as the PageRank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection log(s) 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Sill further information can be recorded, such as described below during discussion of the various features that can be used to build a prior model. Moreover, similar information (e.g., IR scores, position, etc.) can be recorded for an entire session, or multiple sessions of a user, including potentially recording such information for every click that occurs both before and after a current click.

The information stored in the result selection log(s) 2060 can be used by the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
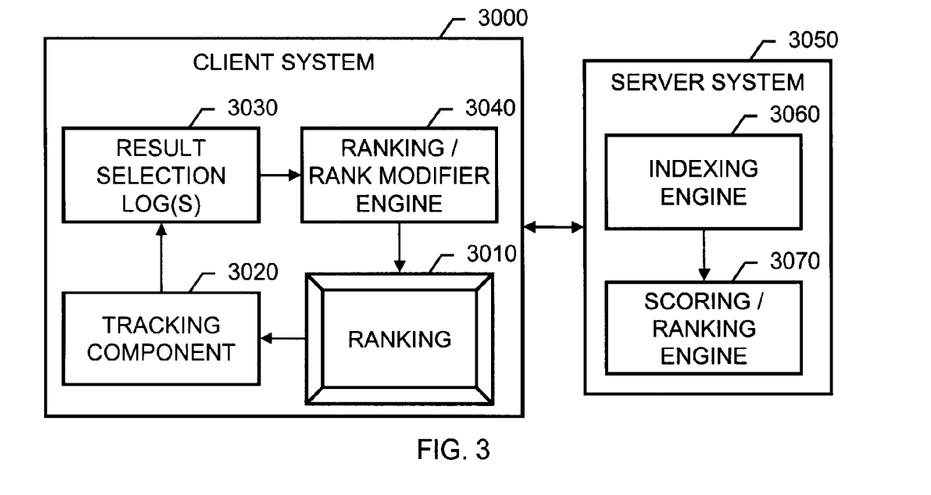
FIG. 3 shows another example information retrieval system.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection log(s) 3030 and a ranking/rank modifier engine 3040. For example, the client system 3000 can include a company's enterprise network and personal computers, in which a browser plug-in incorporates the ranking/rank modifier engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

Figure 4A:
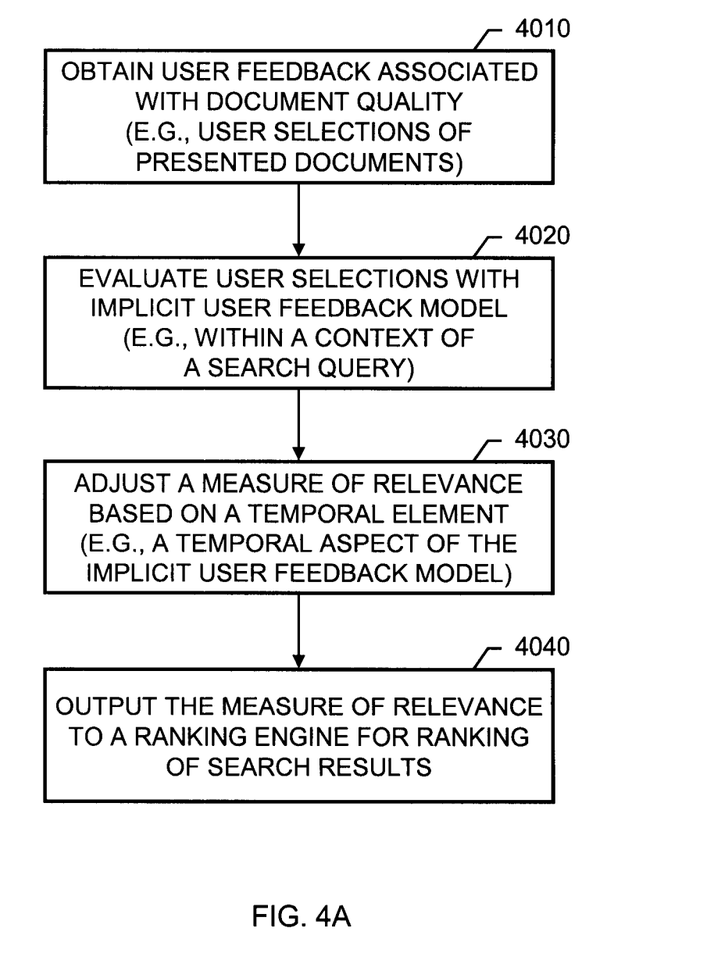
FIG. 4A shows an example process of using a temporal element of user feedback to improve search result rankings.

FIG. 4A shows an example process of using a temporal element of user feedback to improve search result rankings. User feedback associated with document quality can be obtained 4010. This user feedback can be explicit user feedback (e.g., a user's express rating of a web page through a feedback interface provided with a web browser), implicit user feedback (e.g., a measure of page quality derived from how long the user views the web page), or a combination of these, which can be used to derive a measure of relevance for documents. For example, obtaining user feedback can involve receiving user selections of documents presented by a document search service, such as described above.

User selections can be evaluated 4020 in accordance with an implicit user feedback model to determine a measure of relevance in accordance with the implicit user feedback model. Various different implicit user feedback models can be employed. In general, individual selections of document results can be tracked. For example, in a web based information retrieval system, user's click data on web page search results can be gathered and stored in log(s), which can be kept for all user queries. When a user clicks on a search result, the click can be tracked via JavaScript code embedded in the search results page, an embedded browser tag, etc. This code can track when and on what a user clicks in the main search results page, and can track when the user returns to that main page.

Post-click behavior can also be tracked via pre-installed software at the client (e.g., a toolbar plug-in to the client's operating system). Provided the user opts into fully sharing their browsing behavior, the toolbar software can track all the pages that the user visits, both before and after the search results page is delivered.

The information gathered for each click can include: (1) the query (Q) the user entered, (2) the document result (D) the user clicked on, (3) the time (T) on the document, (4) the interface language (L) (which can be given by the user), (5) the country (C) of the user (which can be identified by the host that they use, such as www.google.co.uk to indicate the United Kingdom), and (6) additional aspects of the user and session. The time (T) can be measured as the time between the initial click through to the document result until the time the user comes back to the main page and clicks on another document result. Moreover, an assessment can be made about the time (T) regarding whether this time indicates a longer view of the document result or a shorter view of the document result, since longer views are generally indicative of quality for the clicked through result. This assessment about the time (T) can further be made in conjunction with various weighting techniques.

Document views resulting from the selections can be weighted based on viewing length information to produce weighted views of the document result. Thus, rather than simply distinguishing long clicks from short clicks, a wider range of click through viewing times can be included in the assessment of result quality, where longer viewing times in the range are given more weight than shorter viewing times. This weighting can be either continuous or discontinuous.

A continuous function can be applied to the document views resulting from the selections. Thus, the weight given to a particular click through time can fall within a continuous range of values, as defined by the specified function. Alternatively, a discontinuous function can be applied to the document views resulting from the selections. For example, there can be three viewing time categories, each having a corresponding weight. Note that such functions can be explicitly defined, or merely implicit in the software implementation.

In the case of discontinuous weighting, the individual selections of the document result can be classified into viewing time categories, and weights can be assigned to the individual selections based on results of the classifying. For example, a short click can be considered indicative of a poor page and thus given a low weight (e.g., −0.1 per click), a medium click can be considered indicative of a potentially good page and thus given a slightly higher weight (e.g., 0.5 per click), a long click can be considered indicative of a good page and thus given a much higher weight (e.g., 1.0 per click), and a last click (where the user doesn't return to the main page) can be considered as likely indicative of a good page and thus given a fairly high weight (e.g., 0.9). Note that the click weighting can also be adjusted based on previous click information. For example, if another click preceded the last click, the last click can be considered as less indicative of a good page and given only a moderate weight (e.g., 0.3 per click).

The various time frames used to classify short, medium and long clicks, and the weights to apply, can be determined for a given search engine by comparing historical data from user selection logs with human generated explicit feedback on the quality of search results for various given queries, and the weighting process can be tuned accordingly. Furthermore, these time frames and weights can be adjusted based on one or more viewing length differentiators, as is described further below.

The weighted views of the document result can be combined to determine a number to be used in determining a measure of relevance. For example, the weighted clicks described above can be summed together for a given query-document pair. Note that safeguards against spammers (users who generate fraudulent clicks in an attempt to boost certain search results) can be taken to help ensure that the user selection data is meaningful, even when very little data is available for a given (rare) query. These safeguards can include employing a user model that describes how a user should behave over time, and if a user doesn't conform to this model, their click data can be disregarded. The safeguards can be designed to accomplish two main objectives: (1) ensure democracy in the votes (e.g., one single vote per cookie and/or IP for a given query-URL (Universal Resource Locator) pair), and (2) entirely remove the information coming from cookies or IP addresses that do not look natural in their browsing behavior (e.g., abnormal distribution of click positions, click durations, clicks per minute/hour/day, etc.). Suspicious clicks can be removed, and the click signals for queries that appear to be spammed need not be used (e.g., queries for which the clicks feature a distribution of user agents, cookie ages, etc. that do not look normal).

A measure of relevance for the document result can be determined within the context of the search query for which the document result is returned. This measure of relevance can be calculated as a fraction, which can be directly applied to IR scores of the search results, thereby boosting the documents in the resulting ranking that have implicit user feedback indicating document quality. For example, a traditional click fraction, which takes into consideration the other results for the given query, has been defined as follows:

$$BASE=[\#WC(Q,D)]/[\#WC(Q)+S0]$$

where #WC(Q,D) is the sum of weighted clicks for a query-URL pair, #WC(Q) is the sum of weighted clicks for the query (summed over all results for the query), and S0 is a smoothing factor.

The click fraction can also employ per-language and per-country fractions (with smoothing there between):

$$LANG=[\#WC(Q,D,L)+S1 \cdot BASE]/[\#WC(Q,L)+S1]$$

$$COUNTRY=[\#WC(Q,D,L,C)+S2 \cdot LANG]/[\#WC(Q,L,C)+S2]$$

where LANG incorporates language specific click data, plus BASE, and COUNTRY incorporates country (and language) specific click data, plus LANG. In this manner, if there is less data for the more specific click fractions, the overall fraction falls back to the next higher level for which more data is available.

Furthermore, it should be noted that different smoothing factors S0, S1 and S2 can be used, or one or more of these can be the same smoothing factor. The smoothing factors used can be determined based on how much traffic is received within the context of the click fraction. For example, for a given country-language tuple, the smoothing factor can be raised concordant with the amount of traffic received (e.g., a larger smoothing factor can be used for US-English queries if a good deal more of such queries are received). In addition, the smoothing factor can be increased for query sources that have historically generated more spamming activity (e.g., queries from Russia).

In addition, as mentioned above, one or more viewing length differentiators (e.g., query category and user type) can be identified for use in the weighting. A viewing length differentiator can include a factor governed by a determined category of the search query, a factor governed by a determined type of a user generating the individual selections, or a combination of them. The document views can be weighted based on the viewing length information in conjunction with the viewing length differentiator(s), such as the determined category of the search query and the determined type of the user. Thus, in the discontinuous weighting case (and the continuous weighting case), the threshold(s) (or formula) for what constitutes a good click can be evaluated on query and user specific bases. For example, the query categories can include "navigational" and "informational", where a navigational query is one for which a specific target page or site is likely desired (e.g., a query such as "BMW"), and an informational query is one for which many possible pages are equally useful (e.g., a query such as "George Washington's Birthday"). Note that such categories may also be broken down into sub-categories as well, such as informational-quick and informational-slow: a person may only need a small amount of time on a page to gather the information they seek when the query is "George Washington's Birthday", but that same user may need a good deal more time to assess a result when the query is "Hilbert transform tutorial".

The query categories can be identified by analyzing the IR scores or the historical implicit feedback provided by the click fractions. For example, significant skew in either of these (meaning only one or a few documents are highly favored over others) can indicate a query is navigational. In contrast, more dispersed click patterns for a query can indicate the query is informational. In general, a certain category of query can be identified (e.g., navigational), a set of such queries can be located and pulled from the historical click data, and a regression analysis can be performed to identify one or more features that are indicative of that query type (e.g., mean staytime for navigational queries versus other query categories; the term "staytime" refers to time spent viewing a document result, also known as document dwell time).

Traditional clustering techniques can also be used to identify the query categories. This can involve using generalized clustering algorithms to analyze historic queries based on features such as the broad nature of the query (e.g., informational or navigational), length of the query, and mean document staytime for the query. These types of features can be measured for historical queries, and the threshold(s) can be adjusted accordingly. For example, K means clustering can be performed on the average duration times for the observed queries, and the threshold(s) can be adjusted based on the resulting clusters.

User types can also be determined by analyzing click patterns. For example, computer savvy users often click faster than less experienced users, and thus users can be assigned different weighting functions based on their click behavior. These different weighting functions can even be fully user specific (a user group with one member). For example, the average click duration and/or click frequency for each individual user can be determined, and the threshold(s) for each individual user can be adjusted accordingly. Users can also be clustered into groups (e.g., using a K means clustering algorithm) based on various click behavior patterns.

Moreover, the weighting can be adjusted based on the determined type of the user both in terms of how click duration is translated into good clicks versus not-so-good clicks, and in terms of how much weight to give to the good clicks from a particular user group versus another user group. Some user's implicit feedback may be more valuable than other users due to the details of a user's review process. For example, a user that almost always clicks on the highest ranked result can have his good clicks assigned lower weights than a user who more often clicks results lower in the ranking first (since the second user is likely more discriminating in his assessment of what constitutes a good result). In addition, a user can be classified based on his or her query stream. Users that issue many queries on (or related to) a given topic (e.g., queries related to law) can be presumed to have a high degree of expertise with respect to the given topic, and their click data can be weighted accordingly for other queries by them on (or related to) the given topic.

Various other factors and approaches can be employed in an implicit user feedback model, but in general, user selections of documents are evaluated in accordance with an overall model of how user activity with respect to search results indicates the quality of those results. This indication of quality can be condensed into a measure of relevance within some defined context, which can include the context of the search query, e.g., the implicit user feedback model can generate a measure of relevance that is applicable only within the context of a given query. For example, evaluating the user selections can involve determining the measure of relevance for the electronic document within the context of the search query for which the electronic document is returned by the document search service, and that same document will thus have a different measure of relevance score when returned for a different query.

In addition, the implicit user feedback model can be changed over time. For example, one or more user selection log(s) can be maintained to store click through data, such as described above. These user selection log(s) can store values of many different features for each document result selection observed. The implicit user feedback model can use selected subsets of these features in determining the measure of relevance, and the selected subsets can be changed, as well as the manner in which they are used, even while the user selections log(s) remain the same (albeit growing larger as more user selections are observed, subject to a cutoff time limit, such as twelve months, after which log data need not be retained).

The measure of relevance for an electronic document can be adjusted 4030 based on a temporal element (e.g., a temporal aspect of implicit user feedback). More recent user feedback can be given higher priority over older user feedback. This can be of particular value in the context of web search, where documents change frequently. In addition, the temporal element can include historic trend(s) in user selections, which can be measured statistically.

The adjustment can be applied to explicit user feedback and to implicit user feedback. The adjustment can be considered part of an implicit user feedback model, in that the temporal element can form part of the model that connects user actions with document quality. Thus, adjusting the measure of relevance can include adjusting in accordance with the implicit user feedback model.

The measure of relevance can be output 4040 to a ranking engine for ranking of search results for a new search. The adjusted measure of relevance can be saved to a computer-readable medium for use by the ranking engine, or otherwise made available to the ranking engine. The adjusted measure of relevance can be directly applied to IR scores for documents, or the measure can be passed through a transform to create a boosting factor that can be applied to the IR scores. For example, the adjusted measure of relevance can be further adjusted based on the given context and historical data combined with human generated relevance ratings (e.g., employed in a tuning process to select an appropriate boosting transform for a given implementation). Moreover, the adjusted measure of relevance can be used to modify and improve the ranking of search results generated for a given query, and the modified ranking can be presented to a user (e.g., on a display device in a web browser user interface).

Figure 4B:
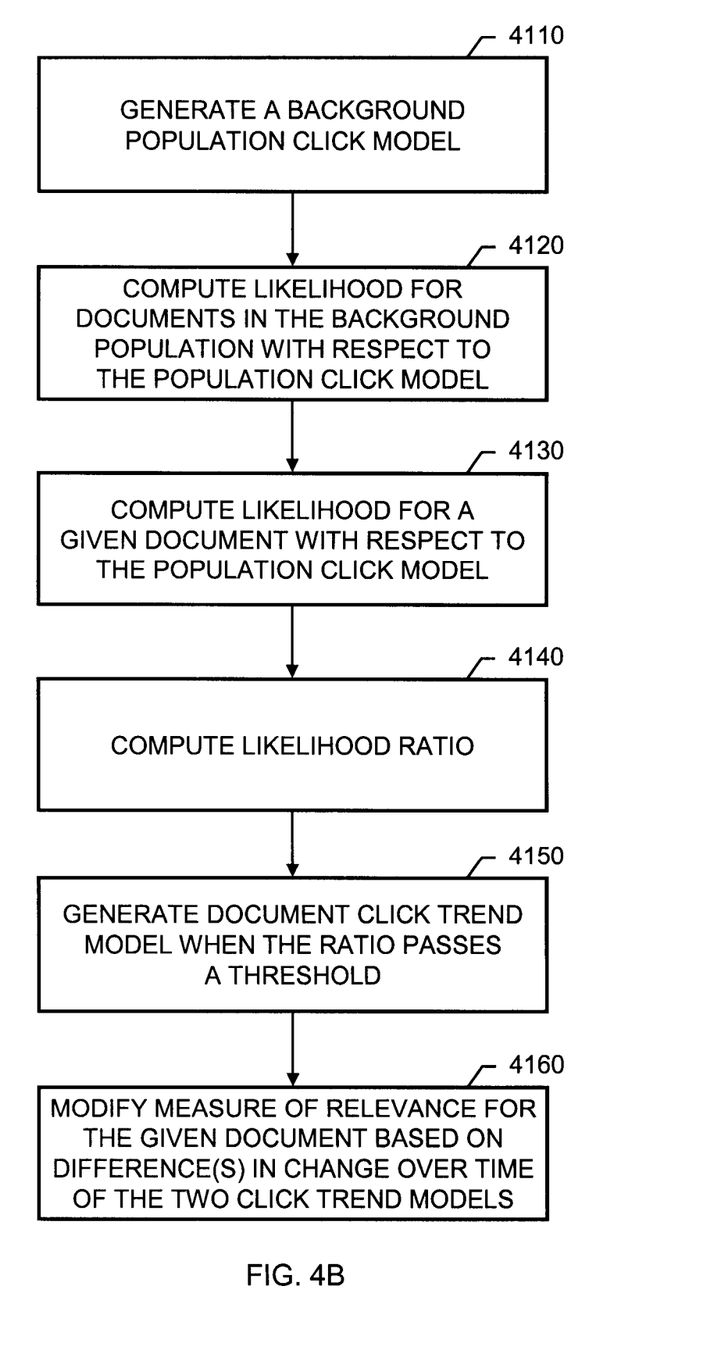
FIG. 4B shows an example process of comparing changes in user selections over time to improve search result rankings.

FIG. 4B shows an example process of comparing changes in user selections over time to improve search result rankings. In this example, a statistical method is used to identify trends in implicit user feedback by comparing individual click trends for a candidate result against the overall trends across one or more queries (the background population). The candidate result is the document that is being considered for ranking adjustment. The background population is a set of documents and features of their prior selection, e.g., (query, document) pairs that establish the baseline trends. The set of documents can contain one or more queries.

A click trend corresponds to temporal change in clicks for a given set of data pulled from the log(s). For example, a click trend can be a set of (t, c) pairs, where each t is a date interval and each c is the volume of clicks accumulated by a result or set of results within that date interval (e.g., the click trend for the candidate result and the click trend for the background population). In addition, a model class is a parametric model family that can be used to model the click trend of a population. The example below uses a linear model, but it should be appreciated that any family of functions (e.g., polynomials of degree k) can be used.

A background population click model (M1) can be generated 4110. This can involve fitting the model class to the background population click trend to minimize squared residual error. For example, the least squares procedure can be used to fit a line to the background population's click trend, and the average squared residual error (E) of the model M1 can be computed. A likelihood for documents in the background population can be computed 4120 with respect to the background population click model. For example, the average log likelihood of all members of the background population can be computed under a Gaussian whose mean is determined by the model M1 and whose variance is E, the average squared residual error. A likelihood for a given document (the candidate result) can be computed 4130 with respect to the background population click model. For example, the average log likelihood of all members of the click trend for the candidate result can be computed under a Gaussian whose mean is determined by the model M1 and whose variance is E.

The likelihood ratio can be computed 4140 for the two likelihood values calculated above, and if the ratio is significantly less than one, then the candidate result behaves differently than the background population. Note that the test to determine if the ratio is significant can be determined empirically and will vary with specific applications. For example, one method to determine a ratio significance test can be to collect and histogram the likelihood ratios for a large set of randomly chosen (query, document) pairs. One can then use human generated relevance ratings from selections within each histogram bin to determine where the appropriate cutoff threshold should be located.

When the ratio passes a selected threshold, the candidate result is considered to behave differently than the background population, and a document click trend model can be generated 4150. The model class can be fit to the candidate result's click trend to obtain the document click trend model (M2), and the rate of change of models M1 and M2 can be compared. For example, if the models M1 and M2 are linear, then the slopes of the two lines can be compared.

Finally, the measure of relevance for the given document (candidate result) can be modified 4160 based on one or more differences in change over time of the two click trend models. For example, if the rate of change of M2 is larger than that of M1, the candidate result can be promoted, and if the candidate's rate of change is less, then it can be demoted. To help ensure that only the most significant trends are captured, the applied boost can be relatively conservative. An example boost formula can be:

$$B*\mathrm{sqrt}(M2/M1)$$

where B is the normal boost value, M2 is the rate of change of the document click trend model, and M1 is the rate of change of the background model. This type of approach can be used in order to dampen the effects and produce a relatively conservative boost.

Figure 4C:
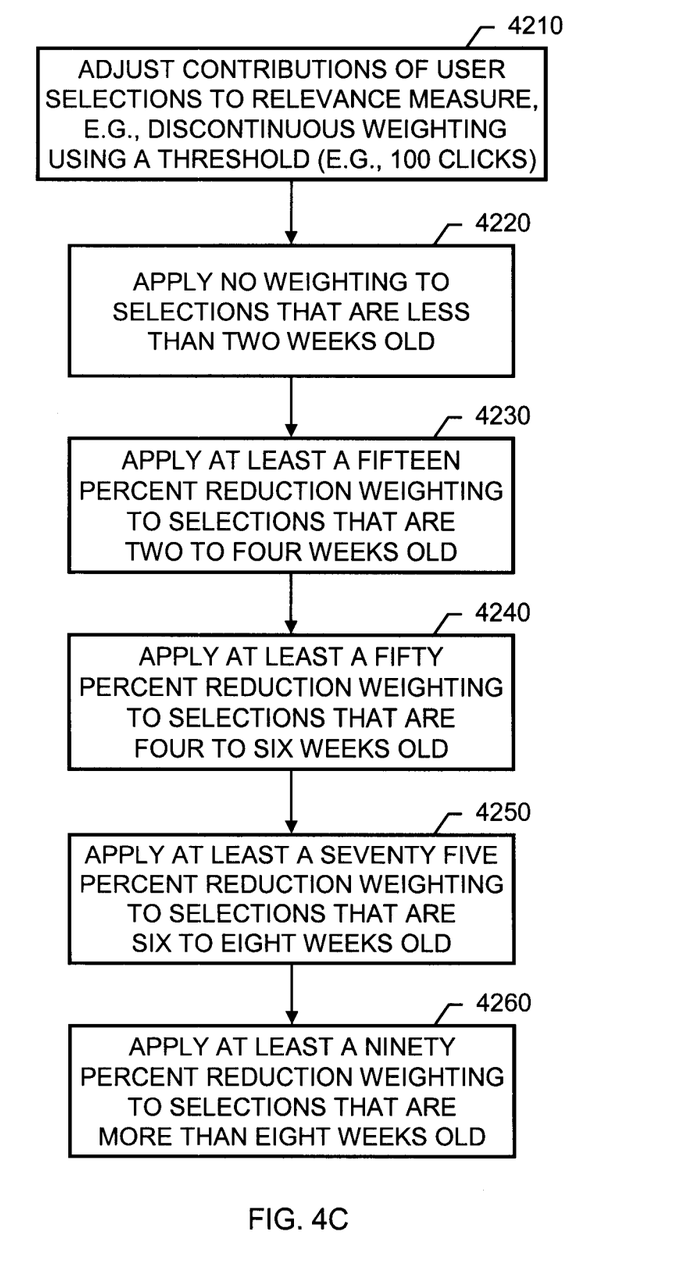
FIG. 4C shows an example process of using temporal distance between a current time and times of past user selections to improve search result rankings.

FIG. 4C shows an example process of using temporal distance between a current time and times of past user selections to improve search result rankings. Contributions of user selections to a relevance measure can be adjusted 4210. This adjustment can involve application of continuous weightings or discontinuous weightings. In addition, a threshold can be used (e.g., 100 clicks) before which no weightings are applied. Multiple variations on the threshold approach are also possible. For example, a recency weighting can be applied when the number of clicks on a query exceeds a first threshold (e.g., 100 clicks) or when the number of clicks on a (query, document) pair exceeds a second threshold (e.g., 60 clicks). Taking multifaceted threshold approach such as this can create a more flexible recency trend model, e.g., such as to allow the system to more quickly catch a very popular, new document.

Gathering user selection data over a large time range (e.g., the trailing twelve months) can assist in capturing queries that are repeated, but only infrequently. By adjusting the measure of relevance based on recency, more recent developing trends can be found. Very popular queries that gather a large number of clicks during the early stage of the data collection interval need not have their developing trends in the latter portion of the interval obscured.

Frequent queries can fall prey to self-reinforcement, where the longer a document is gathering clicks, the more likely it is to place well in future searches and thus to gather more clicks. Such self-reinforcement can be avoided using recency based adjustment. New documents on frequent queries need not be penalized due to their having less time to accumulate clicks, since larger numbers of older clicks can be discounted in the adjustment of the relevance measure. Moreover, because self-reinforcement can be more of a concern for frequent queries, the weighting can be applied when a query accumulates enough clicks to be deemed frequent (e.g., 100 clicks), after which, weights can be assigned to clicks according to age (calculated as distance in the past).

For example, no weighting (a weight multiple of 1.0) can be applied 4220 to user selections that are less than two weeks old. At least a fifteen percent reduction weighting (a weight multiple of 0.75) can be applied 4230 to selections that are two to four weeks old. At least a fifty percent reduction weighting (a weight multiple of 0.5) can be applied 4240 to selections that are four to six weeks old. At least a seventy five percent reduction weighting (a weight multiple of 0.25) can be applied 4250 to selections that are six to eight weeks old. At least a ninety percent reduction weighting (a weight multiple of 0.1) can be applied 4260 to selections that are more than eight weeks old.

This approach can reduce self-reinforcing effects in frequent queries. Infrequent queries can be left unchanged, since in these cases, the click counts will generally be small to begin with and any down-weighting can obscure the information content of the user feedback. Other sets of weights and time span categories are also possible. For example, an exponential decay can be used, such as:

weight=exp(−0.05*t)

where exp is the exponential function and t is the age of the click in weeks. In general, the use of declining weights give more significance to recent information, but still allow historical data to have some contribution to the final measure of relevance. Moreover, this example describes weighting implicit user feedback based on recency, but it should be recognized that similar techniques can be applied to explicit user feedback as well.

Figure 5:
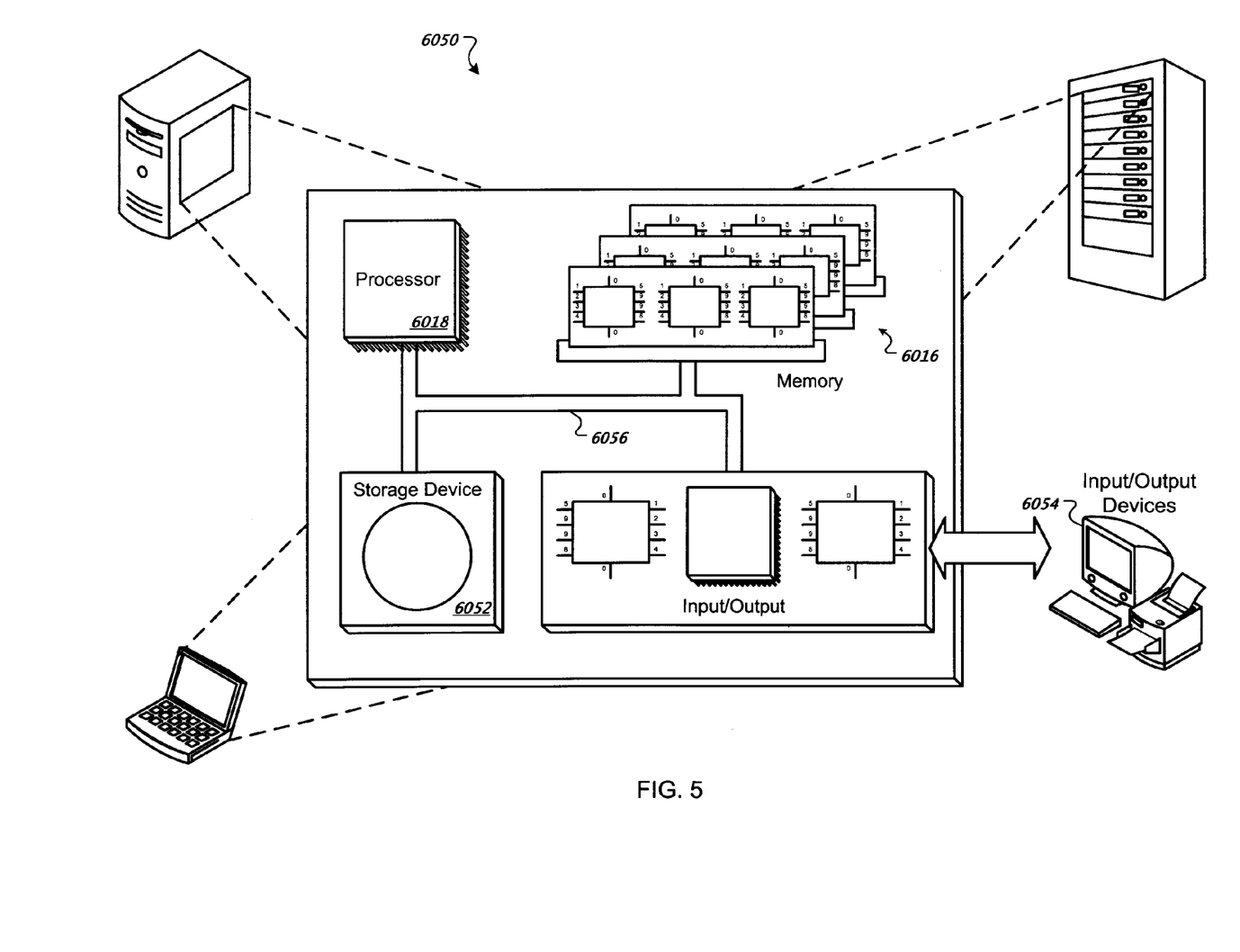
FIG. 5 is a schematic diagram of an example computer system.

FIG. 5 is a schematic diagram of an example computer system 6050. The system 6050 can be used for practicing operations described above. The system 6050 can include a processor 6018, a memory 6016, a storage device 6052, and input/output devices 6054. Each of the components 6018, 6016, 6052, and 6054 are interconnected using a system bus 6056. The processor 6018 is capable of processing instructions within the system 6050. These instructions can implement one or more aspects of the systems, components and techniques described above. In some implementations, the processor 6018 is a single-threaded processor. In other implementations, the processor 6018 is a multi-threaded processor. The processor 6018 can include multiple processing cores and is capable of processing instructions stored in the memory 6016 or on the storage device 6052 to display graphical information for a user interface on the input/output device 6054.

The memory 6016 is a computer readable medium such as volatile or non volatile that stores information within the system 6050. The memory 6016 can store processes related to the functionality of the search engine 1030, for example. The storage device 6052 is capable of providing persistent storage for the system 6050. The storage device 6052 can include a floppy disk device, a hard disk device, an optical disk device, or a tape device, or other suitable persistent storage mediums. The storage device 6052 can store the various databases described above. The input/output device 6054 provides input/output operations for the system 6050. The input/output device 6054 can include a keyboard, a pointing device, and a display unit for displaying graphical user interfaces.

The computer system shown in FIG. 5 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance (such as GOOGLE® in a Box, provided by Google Inc. of Mountain View, Calif.) installed in an enterprise network.

Other implicit user feedback models can be used in place of the click fraction model described above. For example, an implicit user feedback model employing a large-scale logistic regression model that uses the actual query and url as features can be used. The new prior models can be used to denormalize any query-specific click model. In addition, the systems and techniques described above can be applied in other contexts and to other services, such as a bookmarking service (e.g., if a service tracks the number of times a person has bookmarked a particular URL, the URL bookmarking rate can be weighted by recency).

What is claimed is:

1. A computer-implemented method comprising:
   obtaining user feedback associated with quality of a document including receiving user selections of the document and a plurality of other documents presented by a document search service;
   adjusting a measure of relevance for the document, including:
      determining a first click trend for the document, the first click trend comprising a plurality of first date intervals and, for each of the first date intervals, a respective volume of user selections of the document in search results provided by the document search service within the date interval;
      determining a second click trend for the other documents, the second click trend comprising a plurality of second date intervals and, for each of the second date intervals, a respective volume of user selections of the other documents in search results provided by the document search service within the date interval, where contributions of the user selections of the document and the user selections of the other documents to the first click trend and the second click trend, respectively, are based on temporal distance between a current time and times of the user selections;
      comparing the first click trend to the second click trend and determining that a first rate of change for the first click trend is larger than a second rate of change for the second click trend; and
      as a consequence of determining that the first rate of change is larger than the second rate of change, increasing the measure of relevance for the document; and
   outputting the measure of relevance to a ranking engine for ranking of search results, for a search that identifies the document as a search result, the ranking of search results including ranking the document using the measure of relevance.

2. The method of claim 1 further comprising determining the measure of relevance for the document within a context of a search query for which the document is returned by the document search service.

3. The method of claim 1, wherein adjusting the measure of relevance comprises weighting the user selections based on recency of document viewing grouped into time span categories.

4. The method of claim 3, wherein the weighting of the user selections is initiated only after a total number of selections within a context of a search query surpasses a threshold.

5. The method of claim 3, wherein the time span categories comprise less than two weeks old, two to four weeks old, four to six weeks old, six to eight weeks old, and more than eight weeks old, and the weighting comprises:
   applying no weighting to selections that are less than two weeks old;
   applying at least a fifteen percent reduction weighting to selections that are two to four weeks old;
   applying at least a fifty percent reduction weighting to selections that are four to six weeks old;

applying at least a seventy five percent reduction weighting to selections that are six to eight weeks old; and applying at least a ninety percent reduction weighting to selections that are more than eight weeks old.

6. A computer program product, encoded on a computer-readable storage medium, operable to cause data processing apparatus to perform operations comprising:

obtaining user feedback associated with quality of a document including receiving user selections of the document and a plurality of other documents presented by a document search service;

adjusting a measure of relevance for the document, including:

determining a first click trend for the document, the first click trend comprising a plurality of first date intervals and, for each of the first date intervals, a respective volume of user selections of the document in search results provided by the document search service within the date interval;

determining a second click trend for the other documents, the second click trend comprising a plurality of second date intervals and, for each of the second date intervals, a respective volume of user selections of the other documents in search results provided by the document search service within the date interval, where contributions of the user selections of the document and the user selections of the other documents to the first click trend and the second click trend, respectively, are based on temporal distance between a current time and times of the user selections;

comparing the first click trend to the second click trend and determining that a first rate of change for the first click trend is larger than a second rate of change for the second click trend; and as a consequence of determining that the first rate of change is larger than the second rate of change, increasing the measure of relevance for the document; and outputting the measure of relevance to a ranking engine for ranking of search results, for a search that identifies the document as a search result, the ranking of search results including ranking the document using the measure of relevance.

7. The computer program product of claim 6 further comprising determining the measure of relevance for the document within a context of a search query for which the document is returned by the document search service.

8. The computer program product of claim 6, wherein adjusting the measure of relevance comprises weighting the user selections based on recency of document viewing grouped into time span categories.

9. The computer program product of claim 8, wherein the weighting of the user selections is initiated only after a total number of selections within a context of a search query surpasses a threshold.

10. The computer program product of claim 8, wherein the time span categories comprise less than two weeks old, two to four weeks old, four to six weeks old, six to eight weeks old, and more than eight weeks old, and the weighting comprises:

applying no weighting to selections that are less than two weeks old;

applying at least a fifteen percent reduction weighting to selections that are two to four weeks old;

applying at least a fifty percent reduction weighting to selections that are four to six weeks old;

applying at least a seventy five percent reduction weighting to selections that are six to eight weeks old; and applying at least a ninety percent reduction weighting to selections that are more than eight weeks old.

11. A system of one or more computers configured to perform operations comprising:

obtaining user feedback associated with quality of a document including receiving user selections of the document and a plurality of other documents presented by a document search service;

adjusting a measure of relevance for the document, including:

determining a first click trend for the document, the first click trend comprising a plurality of first date intervals and, for each of the first date intervals, a respective volume of user selections of the document in search results provided by the document search service within the date interval;

determining a second click trend for the other documents, the second click trend comprising a plurality of second date intervals and, for each of the second date intervals, a respective volume of user selections of the other documents in search results provided by the document search service within the date interval, where contributions of the user selections of the document and the user selections of the other documents to the first click trend and the second click trend, respectively, are based on temporal distance between a current time and times of the user selections;

comparing the first click trend to the second click trend and determining that a first rate of change for the first click trend is larger than a second rate of change for the second click trend; and as a consequence of determining that the first rate of change is larger than the second rate of change, increasing the measure of relevance for the document; and outputting the measure of relevance to a ranking engine for ranking of search results, for a search that identifies the document as a search result, the ranking of search results including ranking the document using the measure of relevance.

12. The system of claim 11, the operations further comprising determining the measure of relevance for the document within a context of a search query for which the document is returned by the document search service.

13. The system of claim 11, wherein adjusting the measure of relevance comprises weighting the user selections based on recency of document viewing grouped into time span categories.

14. The system of claim 13, wherein the weighting of the user selections is initiated only after a total number of selections within a context of a search query surpasses a threshold.

15. The system of claim 13, wherein the time span categories comprise less than two weeks old, two to four weeks old, four to six weeks old, six to eight weeks old, and more than eight weeks old, and the weighting comprises:

applying no weighting to selections that are less than two weeks old;

applying at least a fifteen percent reduction weighting to selections that are two to four weeks old;

applying at least a fifty percent reduction weighting to selections that are four to six weeks old;

applying at least a seventy five percent reduction weighting to selections that are six to eight weeks old; and applying at least a ninety percent reduction weighting to selections that are more than eight weeks old.

* * * * *